(12) United States Patent
Rogers

(10) Patent No.: US 7,098,893 B2
(45) Date of Patent: Aug. 29, 2006

(54) THUMB AND FINGER GUIDE ATTACHABLE TO A COMPUTER MOUSE AND A COMPUTER MOUSE INCORPORATING SAME

(76) Inventor: Gary Rogers, 282 Woodbine Ave., Northport, NY (US) 11768

( * ) Notice: Subject to any disclaimer, the term of this patent is extended or adjusted under 35 U.S.C. 154(b) by 326 days.

(21) Appl. No.: 10/620,270

(22) Filed: Jul. 15, 2003

(65) Prior Publication Data

US 2005/0062716 A1    Mar. 24, 2005

Related U.S. Application Data

(63) Continuation-in-part of application No. 09/527,641, filed on Mar. 17, 2000, now abandoned.

(51) Int. Cl.
*G09G 3/28* (2006.01)
(52) U.S. Cl. .................. 345/163; 345/157; 345/166
(58) Field of Classification Search ........ 345/156–157, 345/163–164, 167, 169; D14/402–410
See application file for complete search history.

(56) References Cited

U.S. PATENT DOCUMENTS

| | | | | |
|---|---|---|---|---|
| 5,894,302 A | * | 4/1999 | Scenna et al. ............ | 345/163 |
| 5,990,870 A | * | 11/1999 | Chen et al. ............... | 345/163 |
| 6,034,627 A | * | 3/2000 | Wei .......................... | 341/20 |
| 6,197,808 B1 | * | 3/2001 | Cheng et al. ............. | 514/456 |
| 6,256,015 B1 | * | 7/2001 | Adler ........................ | 345/163 |
| 6,266,047 B1 | * | 7/2001 | Benja-Athon ............. | 345/163 |
| 6,297,808 B1 | * | 10/2001 | Yang ........................ | 345/167 |
| 6,377,244 B1 | * | 4/2002 | Reid et al. ................ | 345/163 |
| 6,417,843 B1 | * | 7/2002 | Stephens et al. ......... | 345/167 |
| 6,545,667 B1 | * | 4/2003 | Lilenfield ................. | 345/169 |
| 6,850,224 B1 | * | 2/2005 | Baughman ................ | 345/163 |

* cited by examiner

*Primary Examiner*—Ricardo Osorio
*Assistant Examiner*—Mansour M. Said
(74) *Attorney, Agent, or Firm*—Galgano & Burke, LLP

(57) ABSTRACT

Thumb and finger guide structure for a computer mouse includes two guides, one located on either side of the mouse. One guide is designed to receive the user's thumb and the other is designed to receive the user's little finger. The structure of the present invention positions the user's thumb and little finger with the user's hand in an open relaxed position. The structure allows the mouse to be moved and lifted without gripping its lateral sides. According to one embodiment, the guide structure of the present invention is retro-fitted to an existing mouse by the use of a peel and stick adhesive. According to another embodiment, a computer mouse is provided with the guide structure integral to it and for replacing an existing mouse.

36 Claims, 11 Drawing Sheets

THUMB AND FINGER GUIDE ATTACHABLE TO A COMPUTER MOUSE AND A COMPUTER MOUSE INCORPORATING SAME

RELATED APPLICATION

This application is a continuation-in-part of application Ser. No. 09/527,641 filed Mar. 17, 2000, now abandoned.

BACKGROUND OF THE INVENTION

1. Field of the Invention

The invention relates to a computer mouse. More particularly, the invention relates to a computer mouse having thumb and finger supports and such supports which are attachable to an existing computer mouse.

2. State of the Art

Most state of the art computers incorporate a computer mouse which is used to select icons, menus, text, and other visible selections displayed on the monitor screen associated with the computer. The user will align a pointer on the screen with the desired selection and then depress a mouse key to select the selection. The computer mouse includes an internal track ball such that when the bottom of the mouse is moved on an appropriate surface, the ball rotates and the pointer moves on the screen. The specific operation of the mouse is well understood to those skilled in the art. The computer mouse operates in association with the keyboard to make operation of the computer easier and more user friendly.

As shown in prior art FIGS. 1–3, a computer mouse 10 is a hand held device that includes a palm portion 12 and one or more extended push-button selector switches 14, 16 18. As shown in prior art FIGS. 2 and 3, a user will place his/her palm on the palm portion 12 in a position so that his/her fingers are aligned with the selector switches 14, 16, 18 to be able to readily depress the switches when the pointer is aligned at the desirable location on the screen. Typically, the user's palm will be positioned at a back area of the palm portion 12 opposite to the selector switches so that her finger tips will be contacting the selector switches. In this position, the user's thumb rests against one side 20 of the mouse. Depending on the number of mouse buttons (one, two, or three) the user's middle finger, ring finger, or little finger (respectively) will rest against the other side 22 of the mouse and the mouse will be gripped between this finger and the user's thumb.

Because many computer operations, uses, and activities require long and continuous use of the mouse, the position of the user's hand on the mouse may provide certain problems, such as operator inaccuracy, discomfort, fatigue, achiness, cramps, etc. Further, it has been documented that extended use of a computer mouse may also cause other, more serious, health related problems such as carpal tunnel syndrome. These problems can lead to undesirable situations, such as loss of productivity, increased health costs, and possibly permanent health results.

Different types of support devices used in conjunction with a computer mouse are known in the art that are designed to reduce the discomforts and health risks associated with extended use of the computer mouse. For example, U.S. Pat. No. 5,335,888 issued to Thomsen discloses a forearm support cradle for supporting the forearm of a computer operator above a work surface as the operator's hand and forearm are moved across the work surface to operate a computer mouse. U.S. Pat. No. 5,562,270 issued to Montague discloses a computer mouse pad incorporating a wrist rest to provide a non-fatigue environment for manipulation of a computer mouse. U.S. Pat. No. 5,490,647 issued to Rice discloses a palm rest used in association with a computer mouse to allow the operator of the mouse to rest her palm while activating the mouse to reduce possible health related problems. U.S. Pat. No. 5,581,277 issued to Tjiri discloses a spherical palm support that is releasably attached to a top surface of the computer mouse to allow the mouse operator to rest her palm on the palm support when operating the mouse.

Most of the prior art recognizes that part of the problem is that the use's palm is typically not supported by the mouse when the user grips the mouse to move it. None of the prior art recognizes why the palm is not supported and none recognize that the real cause of hand injury/fatigue is not the location of the user's palm.

SUMMARY OF THE INVENTION

It is therefore an object of the invention to provide a guide structure for a computer mouse which will relieve stress in the user's hand, It is also an object of the invention to provide a computer mouse which incorporates such structure as well as to provide a structure which can be retro-fitted to an existing mouse.

In accord with these objects, the guide structure of the present invention includes two finger guides or supports. One finger guide is intended for the user's thumb and the other is intended for the user's ring or little finger and they are positioned so to maintain the user's thumb and ring or little finger in a relaxed open position where they cannot be used to grip the sides of the mouse.

The present inventor has recognized that the real cause for hand injury/fatigue is not the location of the user's palm, per se, but is the location of the user's fingers which grip the sides of the mouse. It is the gripping of the mouse between the thumb and finger which stresses the user's hand. Users tend to grip the mouse too tightly and often bring to bear the entire weight of their arm against the fingers which are gripping the mouse.

The structure of the present invention maintains the user's thumb and little finger in a position such that they cannot grip the mouse and such that the user's hand is maintained in an open relaxed position. According to one embodiment, the guide structure of the present invention is retro-fitted to an existing mouse by the use of a peel and stick adhesive. According to another embodiment, a computer mouse is provided with the guide structure integral to it and for replacing an existing mouse.

Preferred aspects of the invention include forming the structure from molded plastic; providing the structure in different colors for different colored mice; and covering the structure with an absorbent fabric material.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
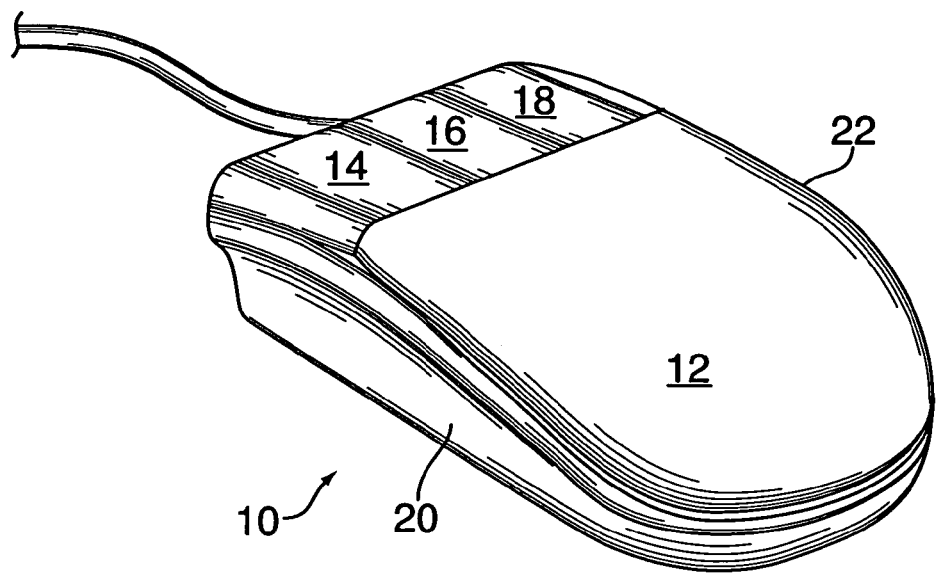
FIG. 1 is a broken perspective view of a prior art three button computer mouse.
Figure 2:
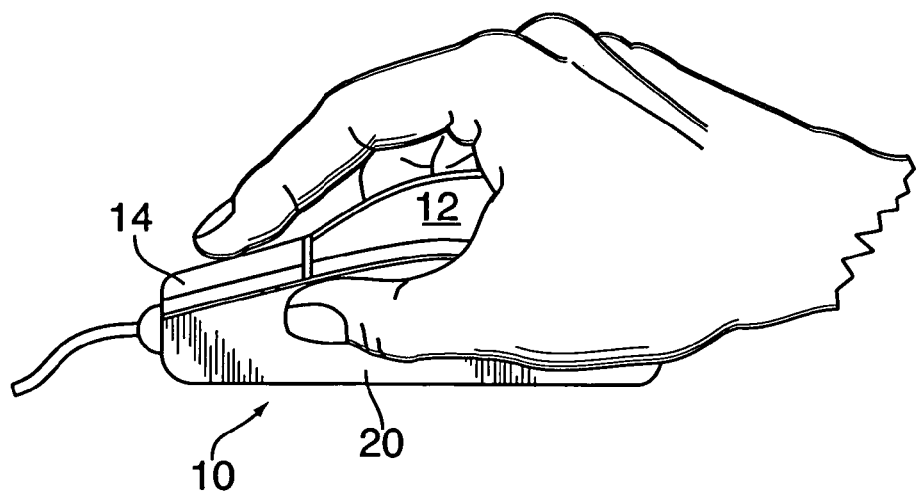
FIG. 2 is a broken side elevational view of a prior art computer mouse being held in the hand of a user.
Figure 3:
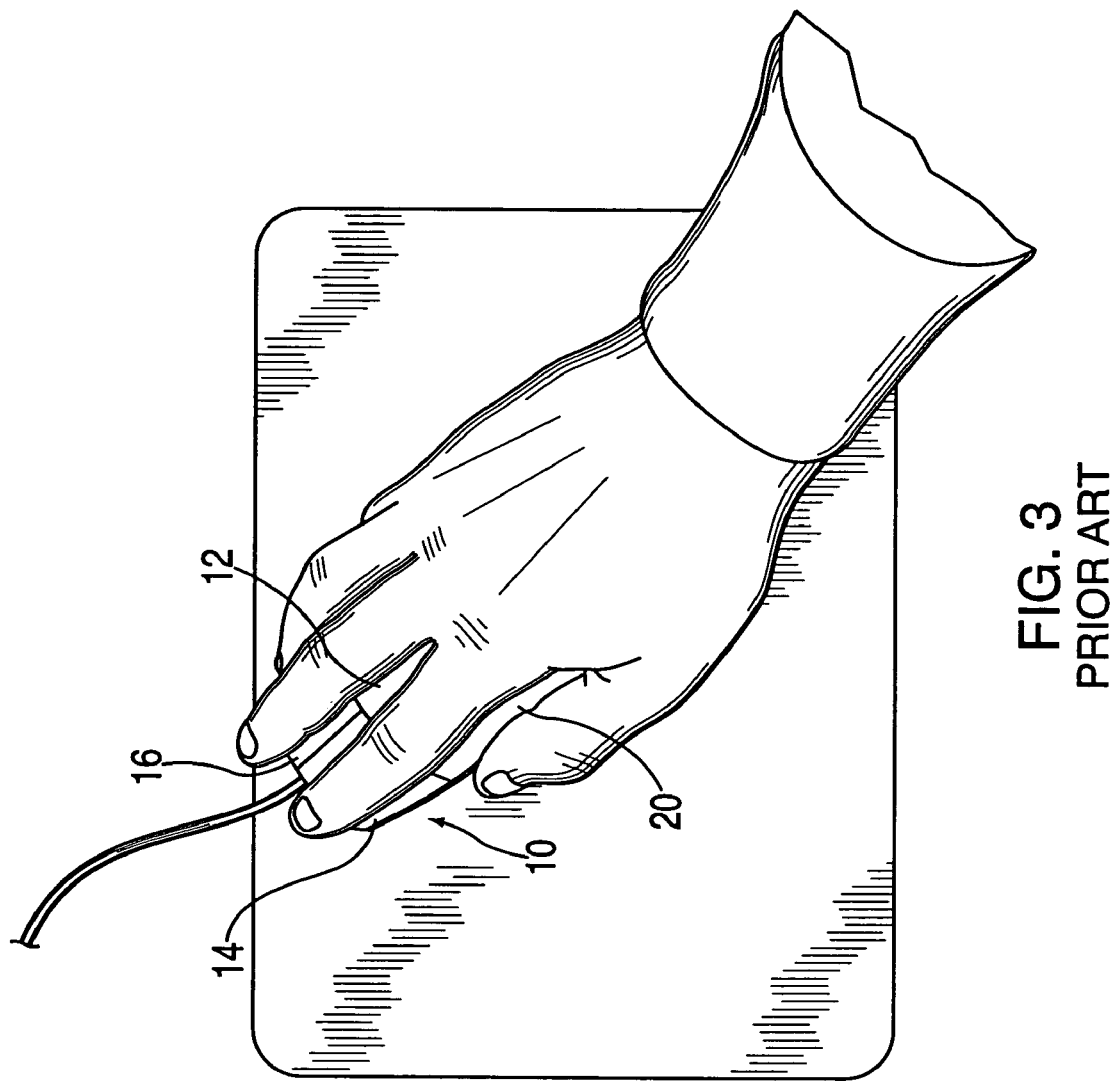
FIG. 3 is a broken perspective view of a prior art computer mouse being held in the hand of a user.
Figure 4:
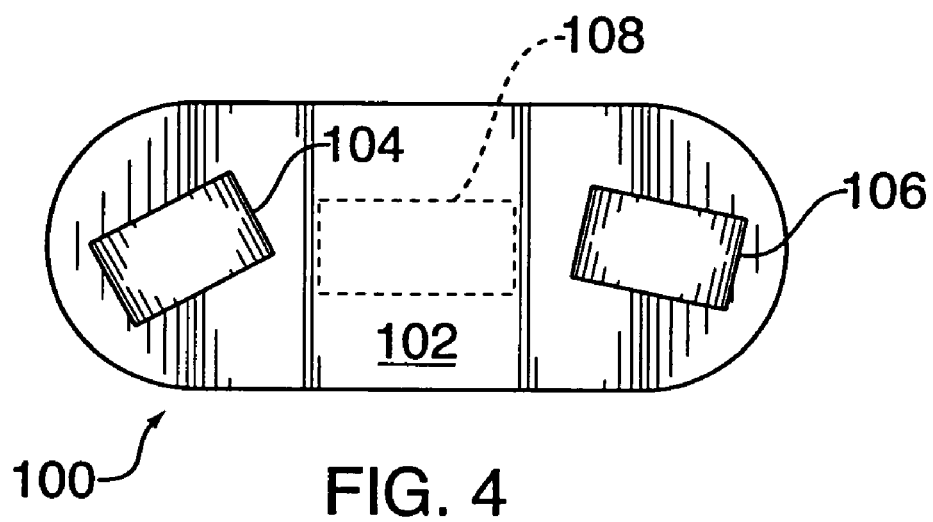
FIG. 4 is a top plan view of a first embodiment of the finger guide structure of the invention for retro-fitting to an existing prior art computer mouse.
Figure 5:
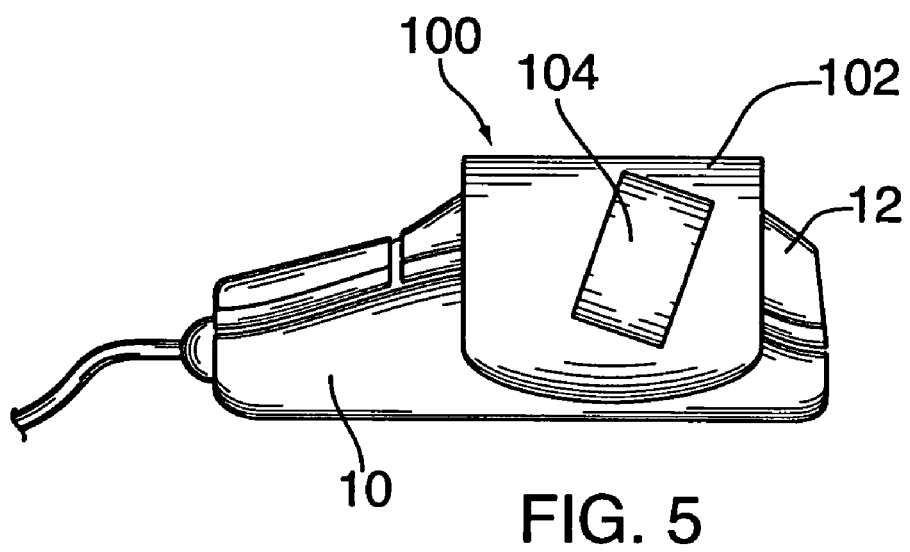
FIG. 5 is a broken side elevational view of the first embodiment of the invention attached to an existing prior art computer mouse.

Referring now to FIGS. 4 and 5, a first exemplary embodiment of the thumb and finger guide structure 100 according to the invention includes a palm portion 102, a thumb ring 104, a finger ring 106, and an adhesive backing 108. Although these simplified drawings appear to show the thumb and finger rings being the same size, the thumb ring 104 is dimensioned to receive an average adult thumb and the finger ring 106 is dimensioned to receive an average adult little or pinky finger when designed for a three button mouse. The overall dimensions of the palm portion 102 and the spacing between the thumb ring 104 and the finger ring 106 are such that, when the structure 100 is attached to an existing mouse 10 as shown in FIG. 5, the thumb ring and the finger ring are spaced apart by an amount approximately to the distance between the thumb and little finger of an average adult hand when the hand is in an open relaxed position. The thumb ring 104 and/or the finger ring 106 are also preferably positioned above the lateral sides of the mouse 10 so as to prevent the user from gripping the sides of the mouse 10.

As shown in FIGS. 4 and 5, the palm portion 102 is dimensioned and shaped to fit over the palm portion 12 of an existing mouse 10. The adhesive backing (preferably peel and stick) 108 is used to couple the guide structure 100 to the mouse 10; of course, other coupling means such as Velcro® hook and loop mechanical fasteners could be employed. Although the simplified drawings show the structure 100 to be symmetrical, the thumb and finger rings are more likely different sizes as mentioned above. In addition, the finger rings are angled to encourage expansion of the hand's fingers. Nevertheless, when designed for use with a two button or single button mouse, the finger ring may be dimensioned to receive the ring finger or middle finger.

The exemplary embodiment shown in FIGS. 4 and 5 is preferably made of a rigid material such as molded plastic. It is contemplated by the invention, however, that it may be desirable to cover the plastic with an absorbent fabric. As mentioned above, the plastic and/or the fabric may be made available in a variety of colors.

Figure 6:
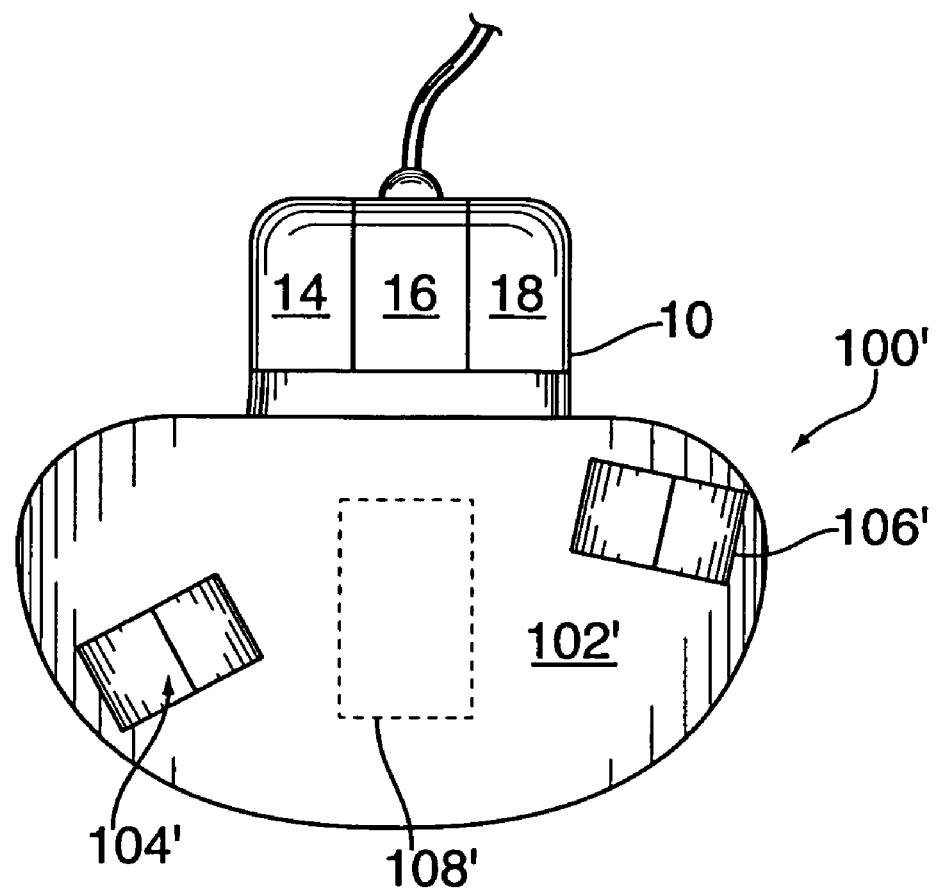
FIG. 6 is a broken top plan view of a second embodiment of the invention attached to an existing prior art computer mouse.
Figure 7:
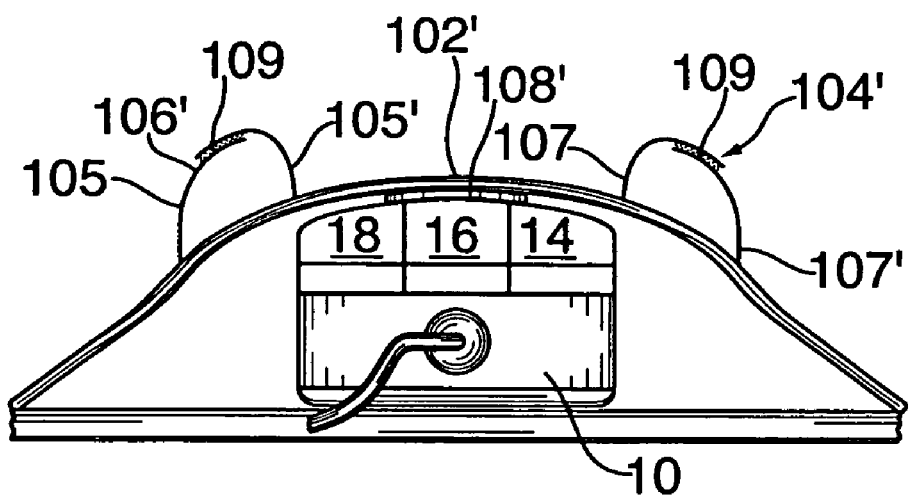
FIG. 7 is a broken end elevational view of the second embodiment of the invention attached to an existing prior art computer mouse.
Figure 8:
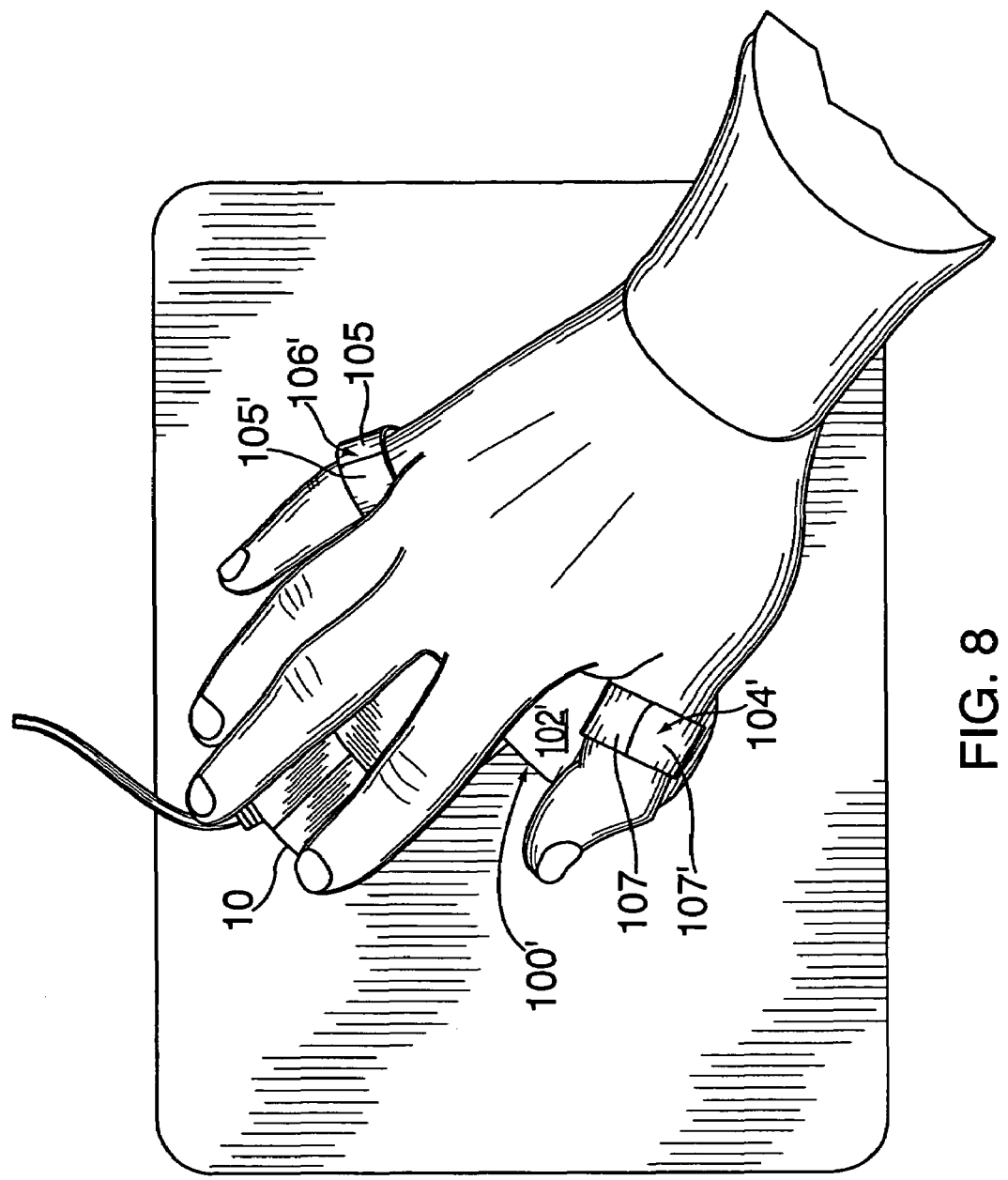
FIG. 8 is a broken perspective view of the second embodiment of the invention attached to an existing prior art computer mouse being held in the hand of a user.

Turning now to FIGS. 6–8, a more refined embodiment of the guide structure 100' is similar to the exemplary embodiment 100 with similar reference numerals referring to similar features. As shown in FIGS. 6–8, the palm portion 102' in this embodiment is somewhat larger than in the previous embodiment. It is also broader in the sense that the structure fits over a mouse 10 like a "wing". This provides better support for the palm in an open, relaxed position with the thumb and little finger appropriately spaced apart. The thumb ring 104' is located closer to the user's wrist than the finger ring 106', conforming to the actual location of the thumb. The thumb and finger rings 104' and 106' are optionally made with openable and closable straps 105, 105', and 107, and 107', respectively, which are releasably affixed together by Velcro® mechanical hook and loop fasteners 109 or the like. This permits the ring diameter to be adjusted comfortably to fit the fingers of the particular user.

Figure 9:
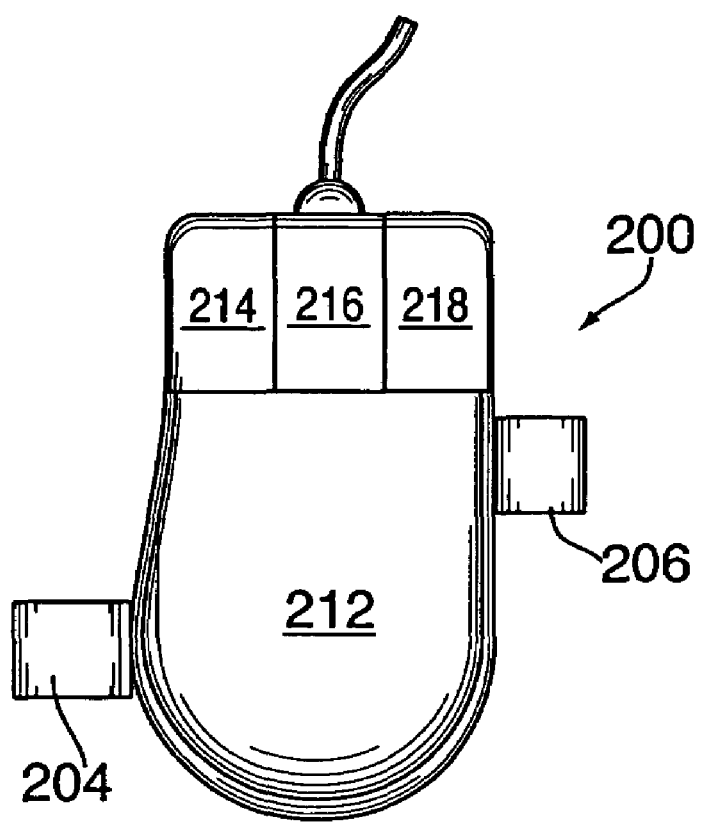
FIG. 9 is a broken top plan view of a third embodiment of the invention incorporated as a feature of a new computer mouse.
Figure 10:
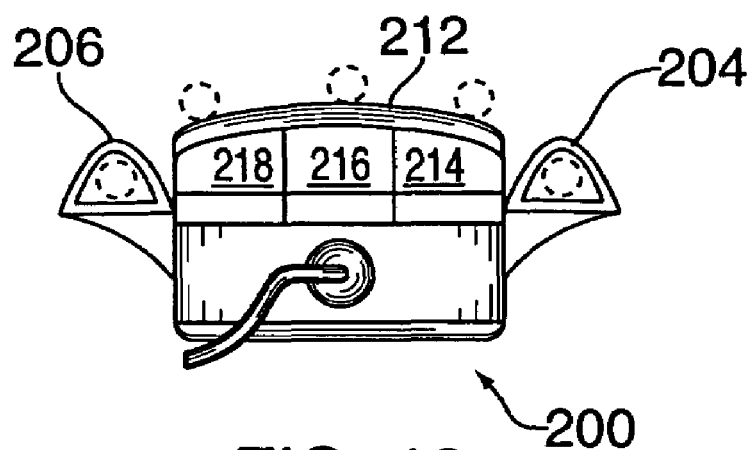
FIG. 10 is a broken end elevational view of the third embodiment of the invention incorporated as a feature of a new computer mouse.

As mentioned above, the invention, though originally conceived as an attachment for an existing mouse, may be incorporated into a new mouse. FIGS. 9 and 10 illustrate in a simplified way how a new mouse 200 can incorporate the features of the invention. The mouse 200 resembles a conventional mouse having a palm portion 212 and three buttons 214, 216, 218. As specifically shown in FIG. 9, a thumb ring 204 has been added at a rearward position and a finger ring 206 has been added at a more forward position on the mouse 200. As shown in FIG. 10, one or both of thumb support 204 and finger support 206 are preferably positioned adjacent upper portion of the lateral sides of the mouse 200 but such that the hand can be maintained in an open relaxed position without cupping and gripping the lateral sides thereof. This embodiment may only be suitable for a child or a person with a small hand as with the rings alone, the hand is somewhat constrained in a tight fingers together position. Nevertheless, from the foregoing, those skilled in the art will also appreciate that a mouse may also be constructed for adults with a broader palm support, preferably as illustrated in FIGS. 6 and 7.

Figure 11:
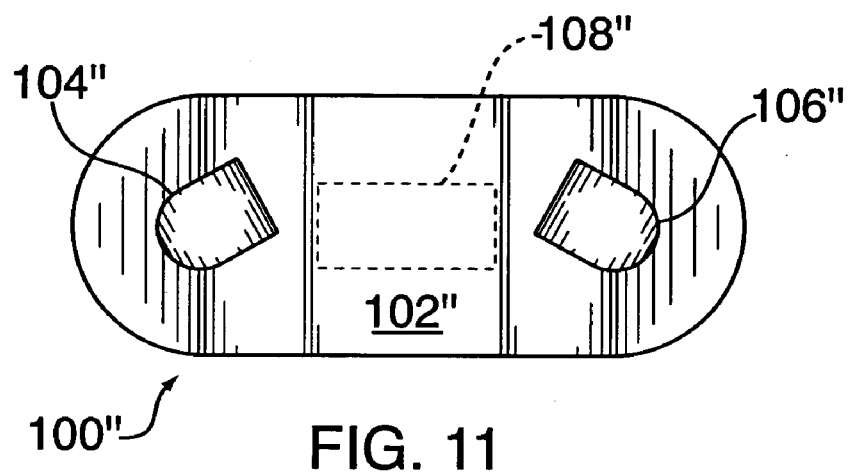
FIG. 11 is a top plan view of a fourth embodiment of the invention for retro-fitting to an existing prior art computer mouse.
Figure 12:
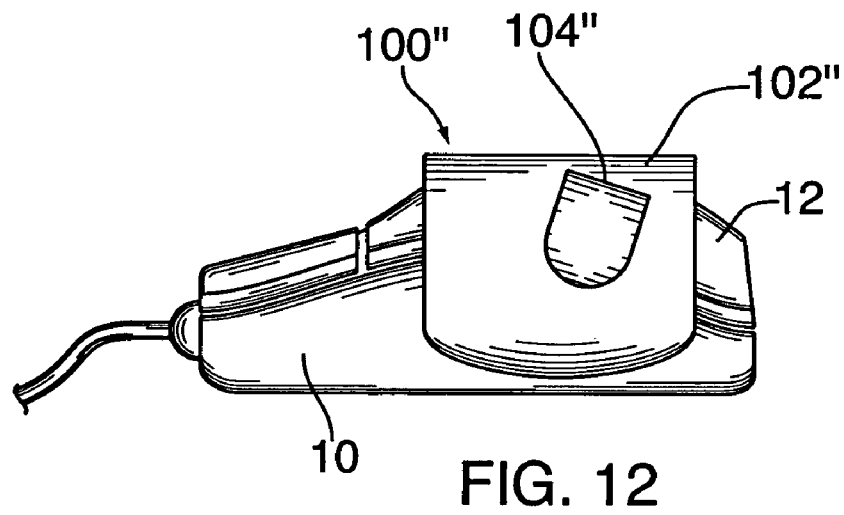
FIG. 12 is a side elevational view of the fourth embodiment of the invention attached to an existing prior art computer mouse.

FIGS. 11 and 12 disclose a further embodiment of the invention which comprises a thumb and finger guide structure 100" which include a generally oval-shaped palm portion 102" having an adhesive backing 108" similar to the earlier embodiments, but instead of the thumb ring 104 and a finger ring 106, has generally, downwardly-opening, arcuate-shaped thumb guide 104" and finger ring guide 106". The overall dimensions of the palm portion 102" and the spacing between the thumb guide 104" and the finger ring guide 106" as well as the angled position thereof are such that, when the structure 100" is attached to an existing mouse 10 (see FIG. 12), the thumb finger guide and the ring finger guide are spaced apart by an amount approximately equal to the distance between the thumb and little finger of an average adult hand when the hand is in an open relaxed position. Here too, one or both of the finger guides are preferably positioned generally adjacent the top of, or above the lateral sides of the mouse to prevent gripping of the lateral sides by the user.

The embodiment shown in the FIGS. 11 and 12 are similar to the embodiment shown in FIGS. 4 and 5 in that the palm portion 102" is dimensioned and shaped to fit over the palm portion 12 of an existing mouse. Although the simplified drawing showed the structure 100" to be symmetrical, the thumb and finger guides 104", 106" are more likely differently sized to accommodate the sizes of an average adult thumb and small or pinky finger. In addition, the finger supports are angled to encourage expansion of the hand's fingers. Nevertheless, when designed for use with a two button or single button mouse, the finger guides may be dimensioned to receive the ring finger or middle finger of the user.

Figure 13:
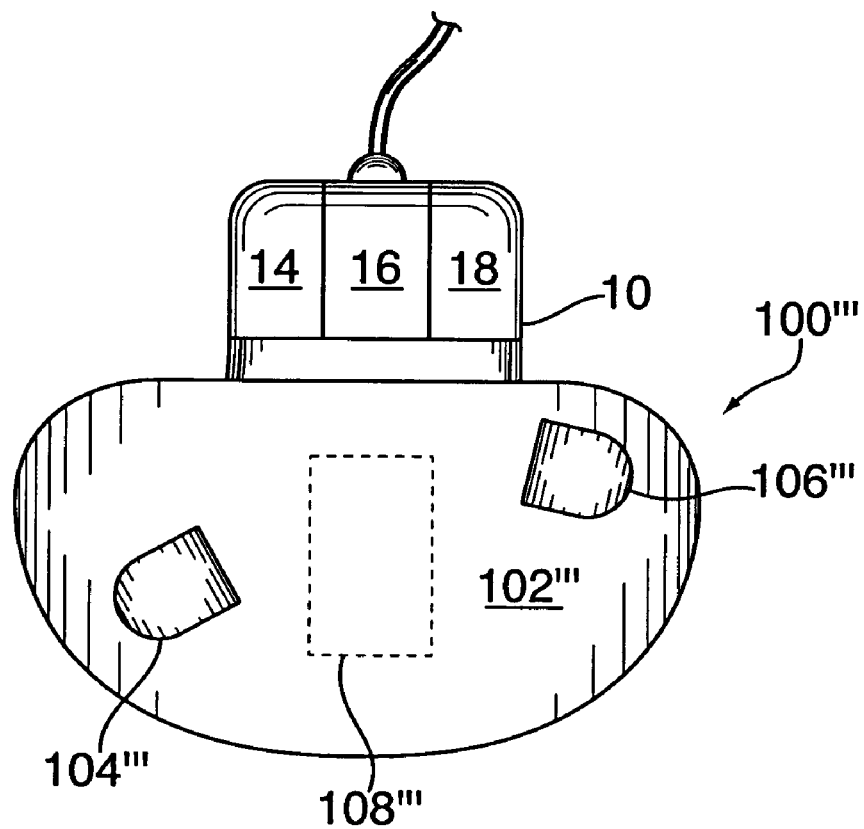
FIG. 13 is a top plan view of a fifth embodiment of the invention and as shown attached to an existing prior art computer mouse.
Figure 14:
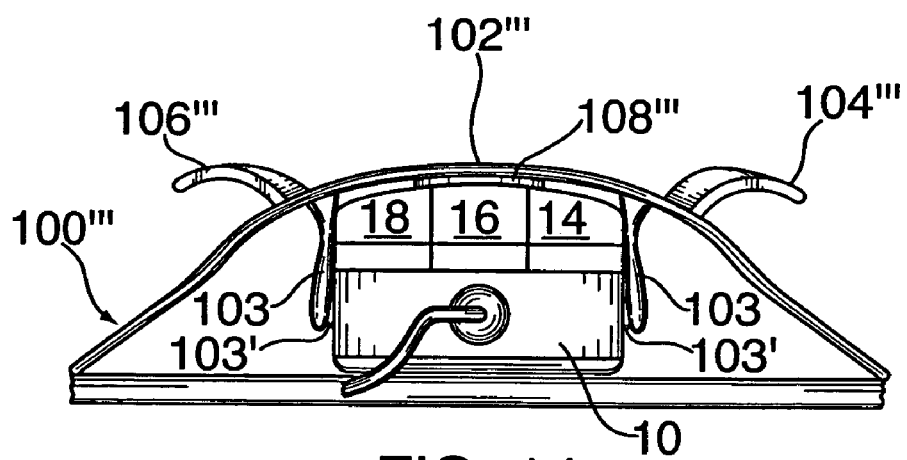
FIG. 14 is a broken end elevational view of the fifth attached to an existing prior art computer mouse.
Figure 15:
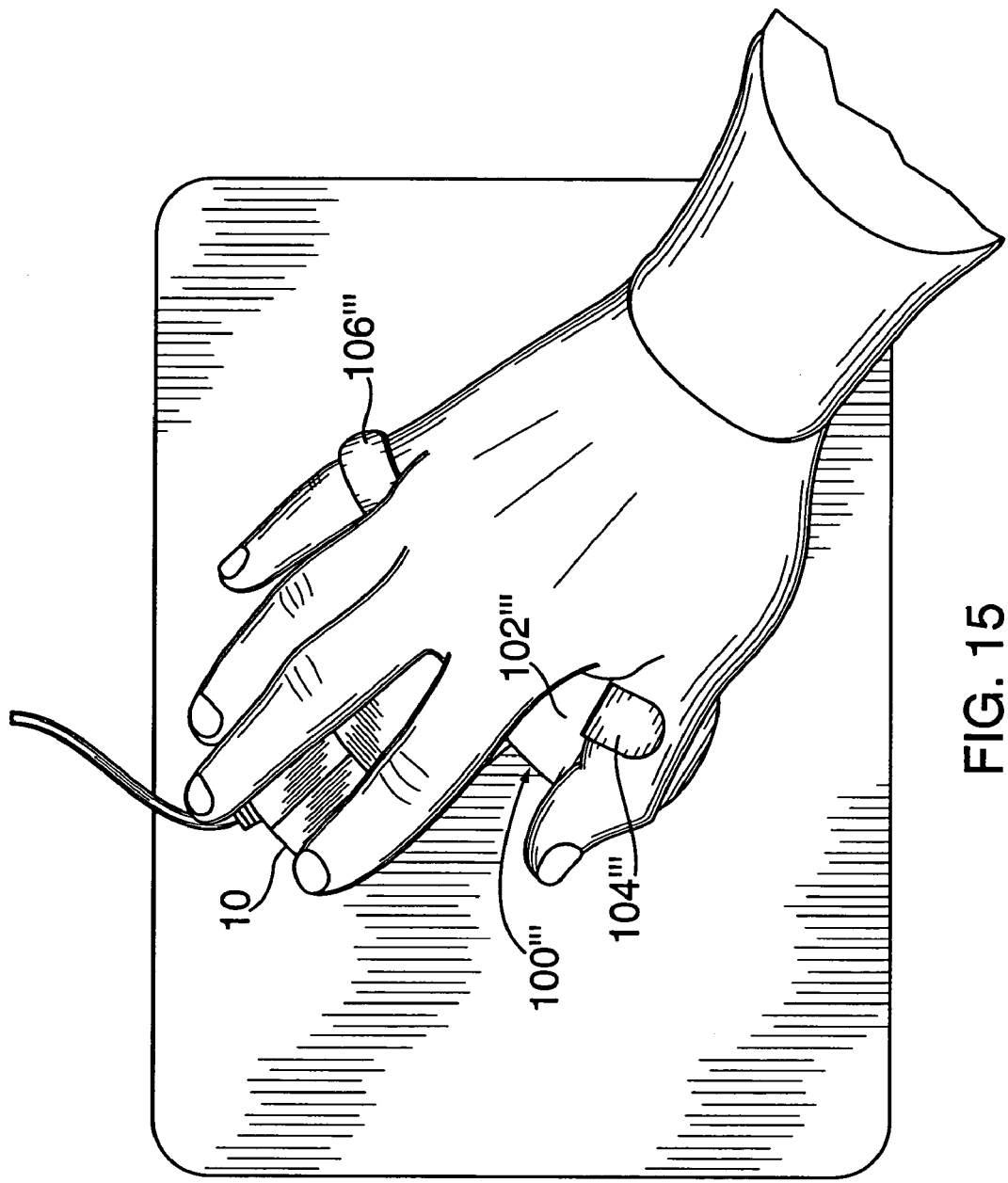
FIG. 15 is a broken perspective view of the fifth embodiment of the invention attached to an existing prior art computer mouse being held in the hand of a user.

Turning now to FIGS. 13–15, this further embodiment is similar to the embodiment shown in FIGS. 6–8, with similar reference numerals referring to similar features. More specifically, the palm portion 102''' in this embodiment is somewhat larger than in the previous embodiment so they assume their normal relaxed open position. The thumb guide 104''' is located closer to the user's wrist than the finger guide 106''' conforming to the actual location of the thumb. As noted above, the generally outwardly, and downwardly opening, arcuate shape thumb and finger guides 104''' and 106''' have a generally elbow, dog-eared or arcuate configuration which permits the thumb and finger of the user to rest comfortably thereunder as shown best in FIG. 15. By the use of these outwardly and downwardly-opening, arcuate, elbow-like guides or lugs 104''' and 106''', the thumb and finger of the user can be easily slid thereunder during use and easily slid out from thereunder when not in use. This avoids the need for a fully enclosed or encircling thumb and finger ring shown such as in the embodiment of FIGS. 4–10. Nevertheless, the guides while allowing easy and facile entry and removal one's fingers from the structure, still affords sufficient "overhead" contact with the user's fingers to allow the user to easily lift and move the mouse while still preventing the user from gripping the lateral sides of the computer mouse (as does the other embodiments) while maintaining the hand in an open natural position to reduce stress and fatigue.

As seen best in FIG. 14, mouse 10 is adhesively attached to palm portion 102''' via adhesive patch 108'''. Optionally, palm portion 102''' is provided with two spaced apart downwardly-depending legs 103 which straddle mouse 10 and which are provided with self-sticking pads 103' by which they can be affixed to the lower lateral sides of mouse 10.

Figure 16:
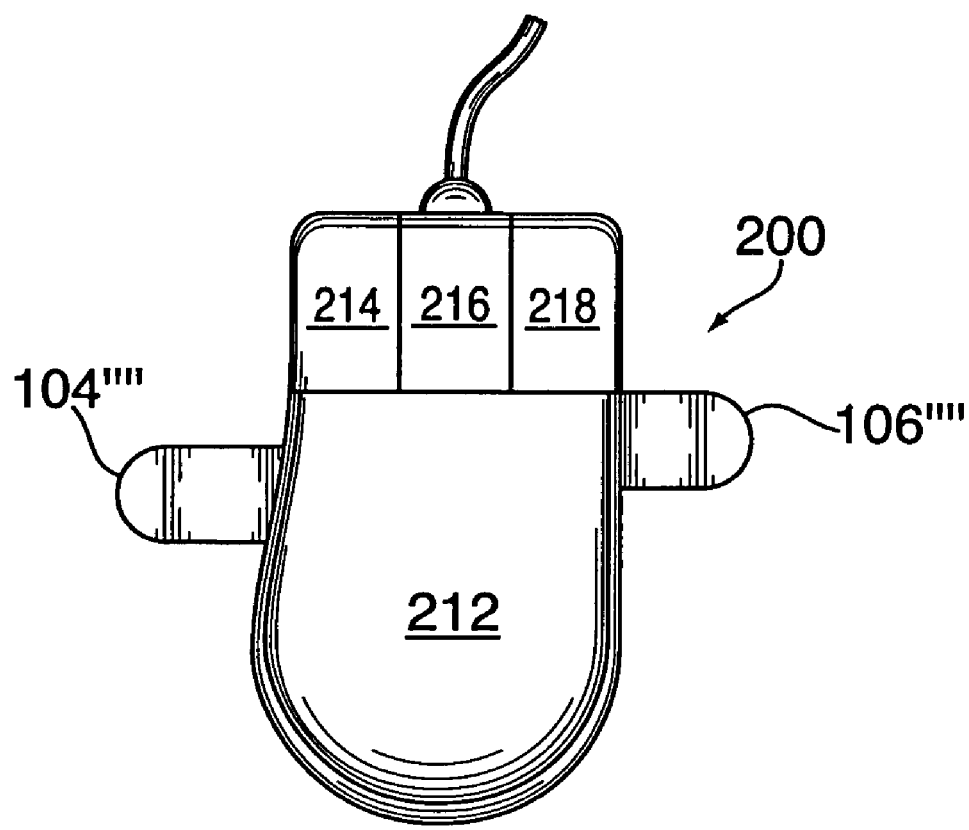
FIG. 16 is a broken top plan view of a sixth embodiment of the invention incorporated as a feature of a new computer mouse.
Figure 17:
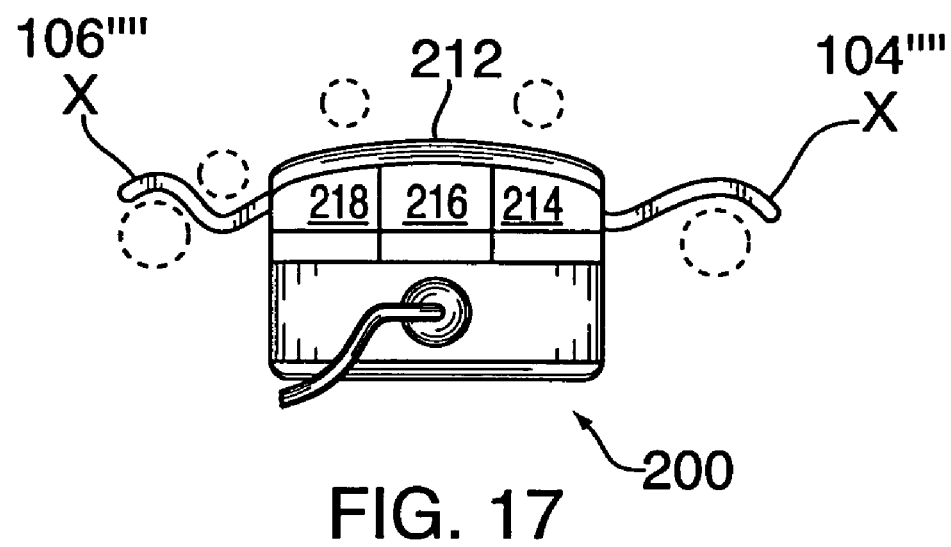
FIG. 17 is a broken end elevational view of the sixth embodiment of the invention incorporated as a feature of a new computer mouse, and showing in phantom line, the positioning of the intended use's fingers.

FIGS. 16 and 17 illustrate a further embodiment of the invention comparable to FIGS. 9 and 10 in that it may be incorporated into a new mouse 200 having a palm portion 212 and three buttons 214, 216, 218. Two resilient, bendable dog-ear like tabs 104"" and 106"" are incorporated in mouse 200 which extend laterally outward from opposite lateral sides of mouse 200 which are disposed generally near the top of the sides. The intended position of one's fingers are shown in phantom line in FIG. 17. As in the other embodiments, one on both of the thumb and finger tabs 104"" and 106"" are positioned so as to prevent the user from gripping the sides of the mouse 200. As can be appreciated, the tabs via bending can be optimally adjusted to accommodate the user's hand.

Figure 18:
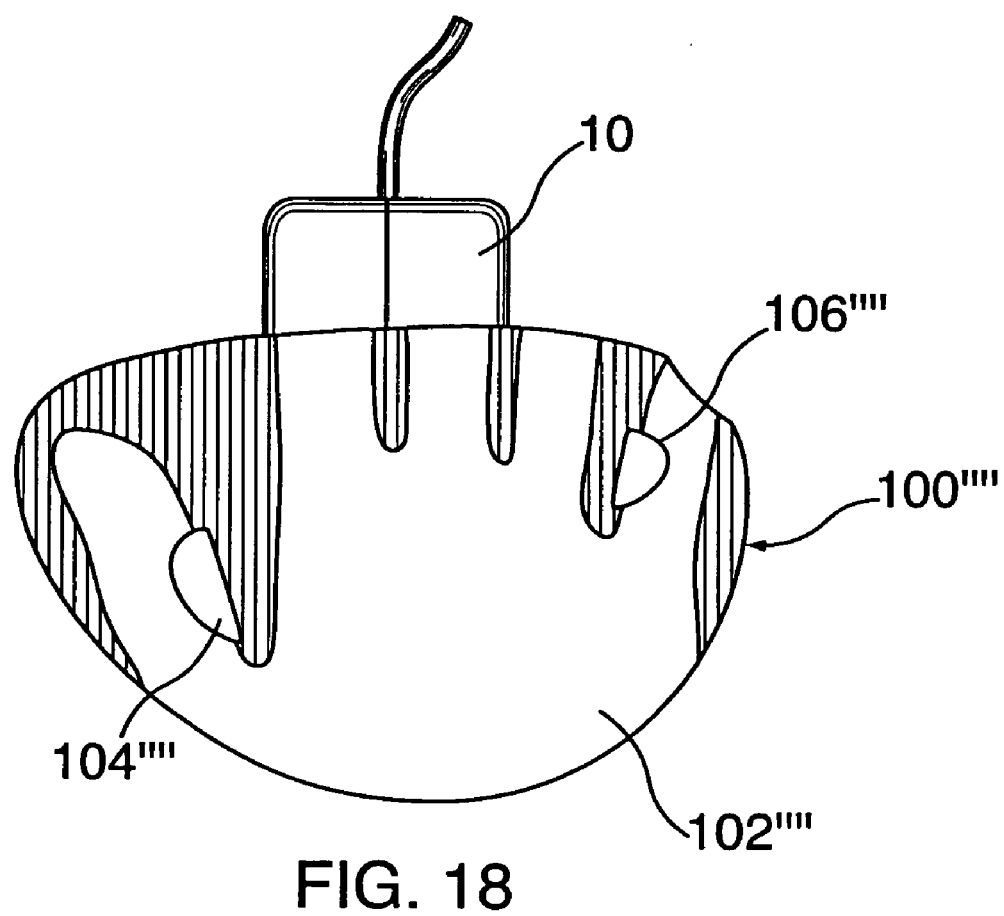
FIG. 18 is a top plan view of a seventh embodiment of the invention attached to an existing prior art mouse wherein the guide structure includes an imprinted or outlined hand palm portion for assisting in correctly positioning the user's hand.

FIG. 18 discloses a further embodiment of the invention wherein the thumb and finger guide and supporting structure 100"" has the wing-like palm portion 102"" with the outline of the user's head formed thereon to show the correct positioning of the user's fingers. Preferably, the outline is recessed in the palm portion to provide a more ergometric positioning of the user's hand. The thumb guide 104"" and finger guide 106"" are the same as shown in FIGS. 13–15. In this embodiment, palm portion 102"" is covered with a fabric material.

There have been described and illustrated herein several embodiments of a thumb and finger support for a computer mouse. While particular embodiments of the invention have been described, it is not intended that the invention be limited thereto, as it is intended that the invention be as broad in scope as the art will allow and that the specification be read likewise. Thus, while the invention has been disclosed as being dimensioned to fit an average adult hand, it will be appreciated that the invention could be made in a variety of sizes to fit large and small hands. Also, while embodiments have been shown which are clearly intended for use with a right hand, it will be recognized that left handed versions of the invention could be provided.

While the embodiments illustrated are shown and described as preferably being either an "add-on" to a conventional mouse or as being incorporated as a feature in a newly-designed mouse, the embodiments can be modified to suit either particular intended use.

It should be realized from the foregoing that it is the purpose of the thumb and finger guides to maintain the user's hand in an open relaxed position when operating the mouse and to prevent the user from gripping the sides of the mouse with his thumb and little or pinky finger which can cause stress in one's hand. This is advantageously accomplished by the invention by positioning one or both of the guides generally above the lateral sides of the mouse. However, this is not necessarily required. For example, as shown in FIGS. 9 and 10, the thumb and finger guides position the thumb and finger generally adjacent to the upper ends of the lateral sides of the mouse, but even so positioned, the thumb and finger of the user are positioned such that the hand is maintained in an open relaxed positioned and so that the user's thumb and small finger cannot effectively grip the sides of the mouse since they are generally positioned out and away from the lateral sides.

While various materials may be used, the guide and/or support structure is preferably made of a rigid material such as molded plastic, although the finger guides or tabs can be made of a resilient, bendable or yieldable metal or plastic material to accommodate a wide range of thumb and finger dimensions. It is also contemplated by the invention, that it may be desirable to cover the plastic with an absorbent fabric. As mentioned above, the plastic and/or the fabric may be made available in a variety of colors.

It will therefore be appreciated by those skilled in the art that yet other modifications could be made to the provided invention without deviating from its spirit and scope as so claimed.

What is claimed is:

1. A thumb and finger guide structure for use with a computer mouse having a palm portion and two lateral opposite sides, said structure comprising:
   a) a palm member dimensioned and shaped to fit over the palm portion of the computer mouse;
   b) a thumb guide ring extending from said palm member;
   c) a little finger ring guide extending from said palm member and spaced from said thumb guide ring, said finger guide ring being spaced from said thumb guide ring by an amount approximately equal to the distance between the thumb and little finger of the hand of the intended user when the hand is in an open relaxed position so that the structure supports the user's hand in an open relaxed position and said guide rings being positioned such that the mouse may be moved and lifted without said user's thumb and finger gripping the two lateral opposite sides thereof; and
   d) means for attaching said structure to an existing computer mouse.

2. A thumb and finger guide structure according to claim 1, wherein at least one of said thumb guide ring and said finger guide ring is disposed generally above a side of said mouse.

3. A thumb and finger guide structure according to claim 1, wherein said means for attaching comprise adhesive means.

4. A thumb and finger guide structure according to claim 1, wherein:
   said palm member is generally curved and shaped to support an average adult palm when the hand is in an open relaxed position.

5. A thumb and finger guide structure according to claim 1, wherein:
   said palm member, said thumb guide ring, and said finger guide ring are formed as an integral plastic member.

6. A thumb and finger guide structure according to claim 5, wherein:
   said palm member is at least partially covered with an absorbent fabric.

7. A thumb and finger guide structure according to claim 1, wherein both of said thumb and finger guide rings are disposed generally above opposite lateral sides of said mouse.

8. A thumb and finger guide structure according to claim 1, additionally including means for adjusting the diameter of said thumb and finger rings.

9. A thumb and finger guide structure according to claim 1, wherein said palm portion has an outline with a hand.

10. A thumb and finger guide structure according to claim 9, wherein said outline of said hand is recessed in said palm.

11. A thumb and finger guide structure according to claim 1, wherein said palm portion has two downwardly depending legs positioned and dimensioned to straddle said mouse and including means mounted thereon for affixing said legs to said mouse.

12. A computer mouse assembly comprising:
   a computer mouse having a palm portion and two opposite lateral sides; and spaced-apart thumb and little finger guide rings attachable to said computer mouse, said little finger guide ring being spaced from said thumb guide ring by an amount approximately equal to the distance between the thumb and the little finger of the hand of the intended user when the hand is in an open relaxed position so that the guides positions the user's hand in an open relaxed position and said guides being positioned such that the mouse may be moved and lifted without said user's thumb and finger gripping the two opposite lateral sides thereof.

13. A computer mouse assembly according to claim 12, comprising a palm member dimensioned and shaped to fit over the palm portion of the computer mouse and which is attachable to said computer mouse, said thumb and finger guide rings being attachable to said mouse via said palm member.

14. A computer mouse assembly according to claim 12, wherein at least one of said thumb and said little finger guide rinds is disposed is generally above a lateral side of said mouse.

15. A computer mouse assembly according to claim 12, wherein: said palm member is generally curved and shaped to support an average adult palm when the hand is in an open relaxed position.

16. A computer mouse assembly according to claim 12, wherein both of said thumb and finger guide rings are disposed generally above opposite lateral sides of said mouse.

17. A computer mouse assembly according to claim 12, additionally including means for adjusting the diameter of said thumb and little finger guide rings.

18. A computer mouse assembly according to claim 12, wherein said palm portion has an outline with a hand.

19. A computer mouse assembly according to claim 18, wherein said outline of said hand is recessed in said palm portion.

20. A thumb and finger guide structure for use with a computer mouse having a palm portion and two lateral opposite sides, said structure comprising:
   a) a palm member dimensioned and shaped to fit over the palm portion of the computer mouse;
   b) a thumb guide extending from said palm member, and a little finger guide extending from said palm member and spaced from said thumb guide, said little finger guide being spaced from said thumb guide by an amount approximately equal to the distance between the thumb and little finger of the hand of the intended user when the hand is in an open relaxed position so that the structure supports the user's hand in an open relaxed position and said guides being positioned such that the mouse may be moved and lifted without said user's thumb and finger gripping the two lateral opposite sides thereof said guides being outwardly and downwardly opening, arcuate flanges; and
   c) means for attaching said structure to an existing computer mouse.

21. A thumb and finger guide structure according to claim 20, wherein at least one of said thumb guide and said finger guide is disposed generally above a side of said mouse.

22. A thumb and finger guide structure according to claim 20, wherein said means for attaching comprise adhesive means.

23. A thumb and finger guide structure according to claim 20, wherein: said palm member is generally curved and shaped to support an average adult palm when the hand is in an open relaxed position.

24. A thumb and finger guide structure according to claim 20, wherein: said palm member, said thumb guide, and said finger guide are formed as an integral plastic member.

25. A thumb and finger guide structure according to claim 24, wherein: said palm member is at least partially covered with an absorbent fabric.

26. A thumb and finger guide structure according to claim 20, wherein both of said thumb and finger guides are disposed generally above opposite lateral sides of said mouse.

27. A thumb and finger guide structure according to claim 20, wherein said outline of said hand is recessed in said palm.

28. A thumb and finger guide structure according to claim 27, wherein said palm portion has an outline with a hand.

29. A thumb and finger guide structure according to claim 20, wherein said palm portion has two downwardly depending legs positioned and dimensioned to straddle said mouse and including means mounted thereon for affixing said legs to said mouse.

30. A computer mouse assembly comprising:
 a computer mouse having a palm portion and two opposite lateral sides; and
 spaced-apart thumb and little finger guides attachable to said computer mouse, said guides being generally outwardly and downwardly opening, arcuate flanges, and said little finger guide being spaced from said thumb guide by an amount approximately equal to the distance between the thumb and the little finger of the hand of the intended user when the hand is in an open relaxed position so that the guides positions the user's hand in an open relaxed position and said guides being positioned such that the mouse may be moved and lifted without said user's thumb and little finger gripping the two opposite lateral sides thereof.

31. A computer mouse assembly according to claim 30, comprising a palm member dimensioned and shaped to fit over the palm portion of the computer mouse and which is attachable to said computer mouse, said thumb and little finger guides being attachable to said mouse via said palm member.

32. A computer mouse assembly according to claim 30, wherein at least one of said thumb and said little finger guides is disposed generally above a lateral side of said mouse.

33. A computer mouse assembly according to claim 30, wherein; said palm member is generally curved and shaped to support an average adult palm when the hand is in an open relaxed position.

34. A computer mouse assembly according to claim 30, wherein both of said thumb and little finger guides are disposed generally above opposite lateral sides of said mouse.

35. A computer mouse assembly according to claim 30, wherein said palm portion has an outline with a hand.

36. A computer mouse assembly according to claim 35, wherein said outline of said hand is recessed in said palm portion.

* * * * *